US012547996B2

(12) United States Patent
Meggs

(10) Patent No.: US 12,547,996 B2
(45) Date of Patent: Feb. 10, 2026

(54) COMPUTING SYSTEM FOR SHARING NETWORKS PROVIDING SHARED RESERVE FEATURES AND RELATED METHODS

(71) Applicant: SHARABLE, LLC, Melbourne, FL (US)

(72) Inventor: Anthony F. Meggs, Melbourne, FL (US)

(73) Assignee: SHARABLE, LLC, Melbourne Beach, FL (US)

( * ) Notice: Subject to any disclaimer, the term of this patent is extended or adjusted under 35 U.S.C. 154(b) by 176 days.

(21) Appl. No.: 18/519,309

(22) Filed: Nov. 27, 2023

(65) Prior Publication Data

US 2024/0095696 A1    Mar. 21, 2024

Related U.S. Application Data

(63) Continuation-in-part of application No. 15/931,786, filed on May 14, 2020, now abandoned.

(60) Provisional application No. 62/869,661, filed on Jul. 2, 2019, provisional application No. 62/851,282, filed on May 22, 2019, provisional application No. 62/851,395, filed on May 22, 2019, provisional application No. 62/851,298, filed on May 22, 2019, provisional application No. 62/851,321, filed on May (Continued)

(51) Int. Cl.
*G06Q 20/10* (2012.01)
(52) U.S. Cl.
CPC .................. *G06Q 20/102* (2013.01)

(58) Field of Classification Search
CPC ......................... G06Q 20/102; G06Q 20/227
See application file for complete search history.

(56) References Cited

U.S. PATENT DOCUMENTS 8,239,222 B2    8/2012    Meggs
8,401,968 B1 *  3/2013    Schattauer ............. G06Q 30/06
                                               705/37

(Continued)

OTHER PUBLICATIONS

Eastman, K., Ruhland, J. S., & Eastman, A. (2010). Regulation of Health Care Sharing Ministries. Journal of Insurance Regulation, 29(2). (Year: 2010).*

(Continued)

*Primary Examiner* — John S. Wasaff
(74) *Attorney, Agent, or Firm* — Allen, Dyer, Doppelt + Gilchrist, PA

(57) ABSTRACT

A computing system may include a memory and a processor configured to cooperate with the memory to interface with a plurality of virtual share exchanges (VSEs), receive requests from the VSEs to share payment of extraordinary healthcare bills from their members having a value exceeding a threshold bill amount across the other VSEs, and determine a shared reserve for each VSE that submits an extraordinary healthcare bill for payment sharing. The shared reserve may correspond to a value of member healthcare bills the VSE is permitted to share across the other VSEs. The processor may further verify that the VSE has not exceeded the shared reserve, and publish each extraordinary healthcare bill for payment sharing to the other VSEs as a respective member of each VSE upon verification that the VSE submitting the extraordinary healthcare bill has not exceeded the shared reserve.

18 Claims, 6 Drawing Sheets

Related U.S. Application Data 22, 2019, provisional application No. 62/851,279, filed on May 22, 2019.

(56) References Cited

U.S. PATENT DOCUMENTS

| | | |
|---|---|---|
| 2002/0022976 A1 | 2/2002 | Hartigan |
| 2003/0135397 A1 | 7/2003 | Halow et al. |
| 2004/0186752 A1* | 9/2004 | Kim .................. G06Q 40/06 705/38 |
| 2004/0254816 A1 | 12/2004 | Myers |
| 2006/0111934 A1* | 5/2006 | Meggs .................. G06Q 40/08 705/2 |
| 2007/0112622 A1 | 5/2007 | Meggs |
| 2007/0150355 A1 | 6/2007 | Meggs |
| 2009/0030801 A1 | 1/2009 | Meggs |
| 2010/0205096 A1 | 8/2010 | Meggs |
| 2010/0228671 A1 | 9/2010 | Patterson |
| 2012/0197794 A1 | 8/2012 | Grigg et al. |
| 2014/0089181 A1 | 3/2014 | Hoffman |
| 2014/0279682 A1 | 9/2014 | Feldman |
| 2015/0051915 A1 | 2/2015 | Moore |
| 2015/0193843 A1 | 7/2015 | Ivanoff et al. |
| 2015/0302384 A1* | 10/2015 | Aadi .................. G06Q 20/29 705/40 |
| 2016/0048823 A1 | 2/2016 | Wetzel et al. |
| 2016/0196397 A1 | 7/2016 | Avganim |
| 2017/0193477 A1 | 7/2017 | Holt et al. |
| 2018/0018736 A1* | 1/2018 | Nogami ............. G06Q 20/4016 |
| 2018/0174153 A1 | 6/2018 | Atagun et al. |
| 2019/0096001 A1 | 3/2019 | Kamrava |
| 2019/0180362 A1* | 6/2019 | Fabris .................. G06Q 20/14 |
| 2019/0180363 A1 | 6/2019 | Fabris et al. |
| 2020/0364804 A1 | 11/2020 | Bechtold |
| 2020/0364805 A1 | 11/2020 | Riese |

OTHER PUBLICATIONS

Gianetto, D. A., Mosleh, M., & Heydari, B. (2018). Dynamic structure of competition networks in affordable care act insurance market. IEEE Access, 6, 12700-12709. (Year: 2018).*

"The Ultimate Guide to Health Care Sharing Ministries—Part 1 ," accessed at https://medium.com/@affordablecarecoach/the-ultimate-guide-to-health-care-sharing-ministries-part-1-97203d76b1 Oa. (Year: 2016) See U.S. Appl. No. 15/931,786.

Galarneau, C "Health care sharing ministries and their exemption from the individual mandate of the Affordable Care Act" Journal of Bioethical Inquiry, 12(2), 269-282. (Year: 2015) See U.S. Appl. No. 15/931,786.

"How Sharing Works" by Samaritan Ministries, accessed via Wayback Machine at https://web.archive.org/web/20190401224658/https://samaritanministries. org/how-sharing-works. (Year: 2019) See U.S. Appl. No. 15/931,786.

* cited by examiner

| SHARING NETWORKS | IHS001 | SOL001 | SMI002 |
|---|---|---|---|
| SHARING UNITS (HHs) | 12,789 | 67,298 | 91,865 |
| DISTRIBUTED BALANCES | $11,098,734 | $54,287,634 | $78,092,357 |
| AVG. SHARED AMOUNT (HH/Mo.) | $ 245.45 | $ 218.78 | $ 213.87 |
| AVG. RESERVE AMOUNT (HHs) | $ 867.83 | $ 806.68 | $ 850.08 |
| ACTUAL RESERVE MONTHS | 3.54 | 3.69 | 3.97 |
| MINIMUM RESERVE MONTHS | 3.00 | 3.00 | 3.00 |
| EXCESS RESERVE MONTHS | 0.54 | 0.69 | 0.97 |
| AVAILABLE SHARED RESERVES | $ 1,681,554 | $10,117,265 | $ 19,150,854 |
| 60 DAY SHARED RESERVES | $108,901 | $ 367,982 | $ 404,789 |
| RESERVE REQUEST PER UNIT | $ 1.61 | $ 1.61 | $ 1.61 |
| CALCULATED CONTRIBUTION | $ 20,608.46 | $108,445.39 | $ 148,033.16 |
| EQUITY ADJUSTMENT | $ - | $ - | $ (52,822.16) |
| EQUITABLE CONTRIBUTIONS | $ 20,610.07 | $108,447.00 | $ 95,212.61 |

FIG. 4

| SHARED RESERVE REQUEST | | |
|---|---|---|
| MEMBER BILL GUIDLINES | | |
| SHARING NETWORK | | IHS001 |
| MEMBER HOUSHOLD | | JONES |
| MEDICAL PROVIDER | | VIERA HOSPITAL |
| PROVIDER INVOICE | | VH-3289765 |
| PUBLISHING GUIDLINES | | ELIGIBLE |
| FINANCIAL DETAILS | | |
| GROSS CHARGES | $ | 757,982 |
| ADJUSTMENTS | $ | (262,987) |
| NET CHARGES | $ | 489,995 |
| MEMBER RESPONSIBILITY | $ | (2,908) |
| APPROVED FOR SHARING | $ | 487,087 |
| PUBLISHING TRIGGER | $ | (210,000) |
| RESERVE REQUEST AMOUNT | $ | 277,087 |
| RESERVE REQUEST (PER UNIT) | $ | 1.61 |
| PARTICIPATING NEWTORK DETAILS | | |
| SHARING NETWORKS | | 3 |
| SHARING UNITS (HHs) | | 171,952 |
| AVAILABLE SHARED RESERVES | $ | 30,949,673 |
| EQUITABLE CONTRIBUTIONS | | |
| IHS-S001 CONTRIBUTION | $ | 20,610 |
| SOL-S001 CONTRIBUTION | $ | 108,447 |
| SMI-S002 CONTRIBUTION | $ | 95,213 |
| TOTAL CONTRIBUTIONS | $ | 224,270 |
| CONTRIBUTIONS (PER UNIT) | $ | 1.30 |

FIG. 5

COMPUTING SYSTEM FOR SHARING NETWORKS PROVIDING SHARED RESERVE FEATURES AND RELATED METHODS

CROSS-REFERENCE TO RELATED APPLICATIONS

This application is a continuation-in-part of U.S. application Ser. No. 15/931,786 filed May 14, 2020, which claims the benefit of provisional application Nos. 62/851,282; 62/851,279; 62/851,298; 62/851,395; 62/851,321 filed May 22, 2019, and provisional application No. 62/869,661 filed Jul. 2, 2019, all of which are hereby incorporated herein in their entireties by reference.

TECHNICAL FIELD

The present invention relates generally to computing systems, and more particularly, to computer infrastructures that provide for interoperability between different computing networks, such as Virtual Share Exchange (VSE) networks.

BACKGROUND

In recent years, health care expense sharing has emerged as a "decentralized" approach to financing and reserving for health care costs. As a "non-insurance" alternative, health care sharing is not subject to typical insurance regulations. Individual participants are legally and ultimately responsible for their own medical bills. However, participants in health care sharing networks willingly and consistently share from their own personal funds to pay each other's medical bills.

Some health care sharing networks implement a technology framework often called a Virtual Share Exchange (VSE). The VSE may include a collection of virtual account management, billing, and payment technologies that form a comprehensive and transparent health care sharing process. The VSE model enables health care sharing networks to facilitate sharing programs on a P2P (or member-to-member) basis to help provide compliance with applicable safe harbor exemptions to insurance regulations.

VSE platforms have enabled healthcare sharing networks to rapidly grow and scale similar to institutional computer network models, like health insurance. Modern VSE platforms have become advanced Fintech applications that integrate all the stakeholders and financial processes that are necessary to facilitate member-to-member sharing via computer networking and electronic payment infrastructure.

SUMMARY

A computing system may include a plurality of different virtual share exchange (VSE) networks. Each VSE network may be configured to maintain member sharing accounts for respective members and electronically transfer funds between the sharing accounts to share payment of member healthcare bills across a plurality of the member sharing accounts based upon a respective set of individual reserve parameters for intra-VSE payment sharing, and to maintain a respective super member account for each of the other VSEs allowing the other VSEs to participate in the intra-VSE payment sharing. The computing system may further include a server comprising a memory and a processor configured to cooperate with the memory to connect the plurality of different VSE networks together in a VSE computing platform, store a database of instructions coded in shared reserve parameters different than the individual reserve parameters for inter-VSE payment sharing across the VSE computing platform, and receive requests from the VSE networks to share payment of extraordinary healthcare bills from their members via respective application programming interfaces (APIs) configured to identify bill submissions having a value exceeding a threshold bill amount across the other VSE networks. The processor may further determine, based upon the instructions coded in the shared reserve parameters, a shared reserve for each VSE network that submits an extraordinary healthcare bill for payment sharing, the shared reserve corresponding to a value of member healthcare bills the VSE network is permitted to share across the other VSE networks, and verify that the VSE network has not exceeded the shared reserve. The processor may also publish, based upon the instructions coded in the shared reserve parameters and via the APIs and super member accounts, each extraordinary healthcare bill for payment sharing across the VSE computing platform to the other VSE networks as a respective member of each VSE network upon verification that the VSE network submitting the extraordinary healthcare bill has not exceeded the shared reserve.

Each VSE may be further configured to dynamically generate in real time for each inter-VSE payment sharing event a single purpose table in a database on the VSE platform for the given member healthcare bill submitted for payment sharing corresponding to the given healthcare provider, with the single purpose table defining a temporary virtual bill account solely for reconciliation of the respective member healthcare bill, and the temporary virtual bill account being externally addressable through a routing number and a unique account number.

By way of example, the shared reserve may comprise a submission cap corresponding to a total value of extraordinary healthcare bills submitted to be shared from the VSE network within a time period. In accordance with another example, the shared reserve may comprise a publishing cap corresponding to a total value of extraordinary healthcare bills published and shared from the VSE network within a time period.

In some embodiments, the processor may be further configured to maintain a database of restricted Current Procedural Terminology (CPT) codes, and restrict publishing of extraordinary healthcare bills for payment sharing to the other VSE networks having the restricted publishing codes. The processor may be further configured to receive all member healthcare bills from each of the VSE networks, and restrict publishing of member healthcare bills for payment sharing across the other VSE networks that do not have a value exceeding the threshold bill amount.

In an example implementation, the processor may be further configured to determine a distributive reserve of funds held in member sharing accounts for each VSE network that submits an extraordinary healthcare bill for payment sharing, and restrict publishing of extraordinary healthcare bills for payment sharing when the VSE network submitting the extraordinary healthcare bill has a distributive reserve below a distributive reserve threshold. Furthermore, each of the VSE networks may comprise a publishing module in memory to publish member healthcare bills to the VSE network, and the processor may be configured to publish the extraordinary healthcare bill for payment sharing to the other VSE networks through their publishing modules.

In some embodiments, the processor may be further configured to calculate a respective contribution amount for payment sharing for each of the other VSE networks based upon a number of members in each VSE network, and publish each extraordinary healthcare bill for payment sharing to the other VSE networks in accordance with their respective contribution amounts. In an example embodiment, each of the VSE networks may comprise an allocation module in memory to match member sharing accounts with published member healthcare bills, and the processor may be configured to receive shared payment for the extraordinary healthcare bill from the VSE networks, and distribute the shared payment to the VSE network requesting payment sharing of the extraordinary healthcare bill via its allocation module.

A related method may include using a server to connect a plurality of different virtual share exchange (VSE) networks, such as those described briefly above, together in a VSE computing platform. The method may further include storing at the server a database of instructions coded in shared reserve parameters different than the individual reserve parameters for inter-VSE payment sharing across the VSE computing platform, and receiving requests at the server from the VSE networks to share payment of extraordinary healthcare bills from their members via respective application programming interfaces (APIs) configured to identify bill submissions having a value exceeding a threshold bill amount across the other VSE networks. The method may also include determining, at the server and based upon the instructions coded in the shared reserve parameters, a shared reserve for each VSE network that submits an extraordinary healthcare bill for payment sharing, with the shared reserve corresponding to a value of member healthcare bills the VSE network is permitted to share across the other VSE networks, and verifying that the VSE network has not exceeded the shared reserve. The method may further include publishing, using the server and based upon the instructions coded in the shared reserve parameters and via the APIs and super member accounts, each extraordinary healthcare bill for payment sharing across the VSE computing platform to the other VSE networks as a respective member of each VSE network upon verification that the VSE network submitting the extraordinary healthcare bill has not exceeded the shared reserve.

BRIEF DESCRIPTION OF THE DRAWINGS

FIG. 4 is a table illustrating an example operation of the shared equity regulator module of the system of FIG. 1.

FIG. 5 is a table illustrating an example shared reserve request which may be generated and published by the server of the computing system of FIG. 1 for payment shared across the VSE network platforms.

BRIEF DESCRIPTION OF THE DRAWINGS

Example embodiments will now be described more fully hereinafter with reference to the accompanying drawings, in which the example embodiments are shown. The embodiments may, however, be implemented in many different forms and should not be construed as limited to the specific examples set forth herein. Rather, these embodiments are provided so that this disclosure will be thorough and complete. Like numbers refer to like elements throughout.

Figure 1:
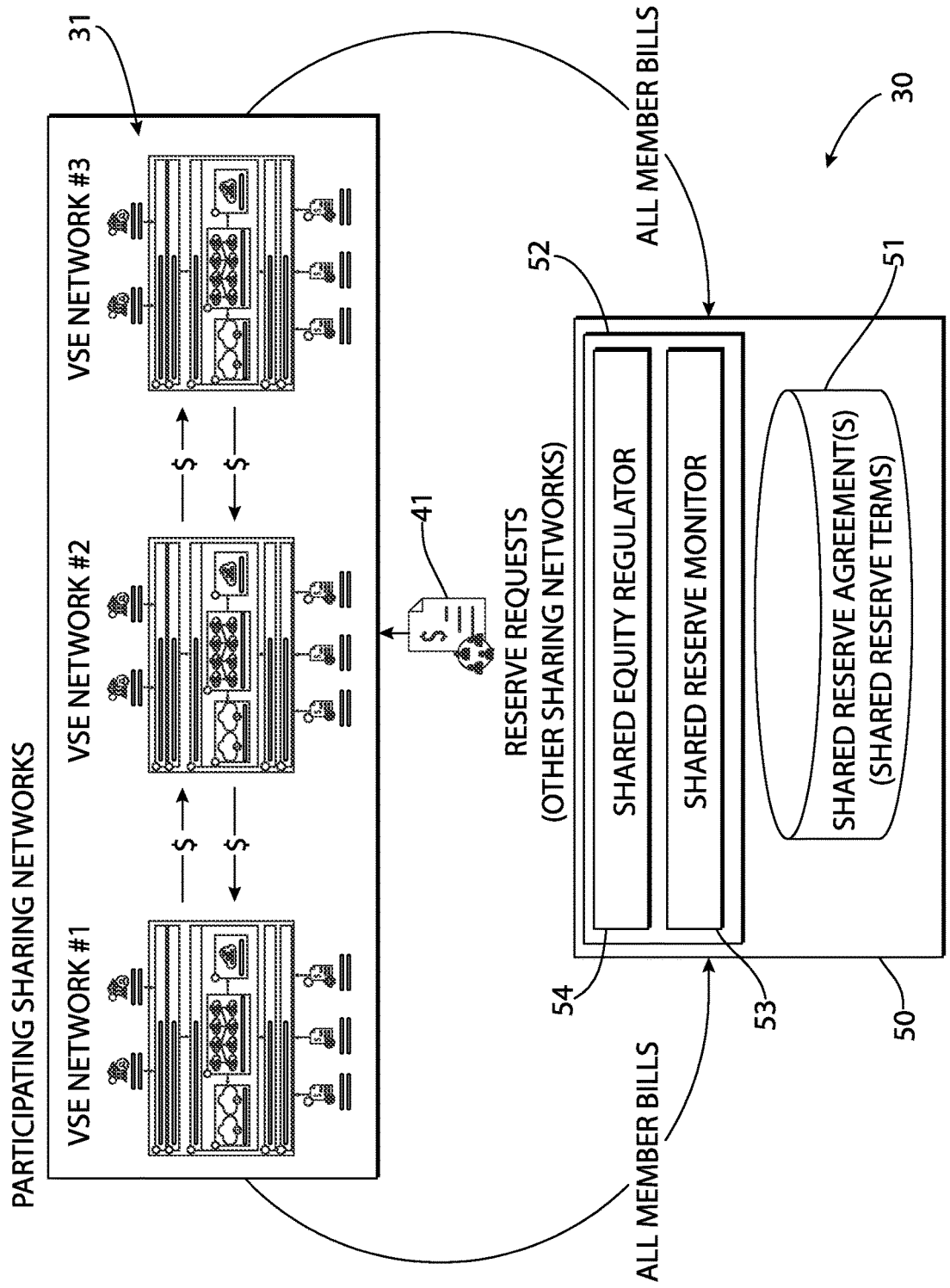
FIG. 1 is a schematic block diagram of a computing system providing payment sharing across different virtual share exchange (VSE) network platforms in accordance with an example embodiment.
Figure 2:
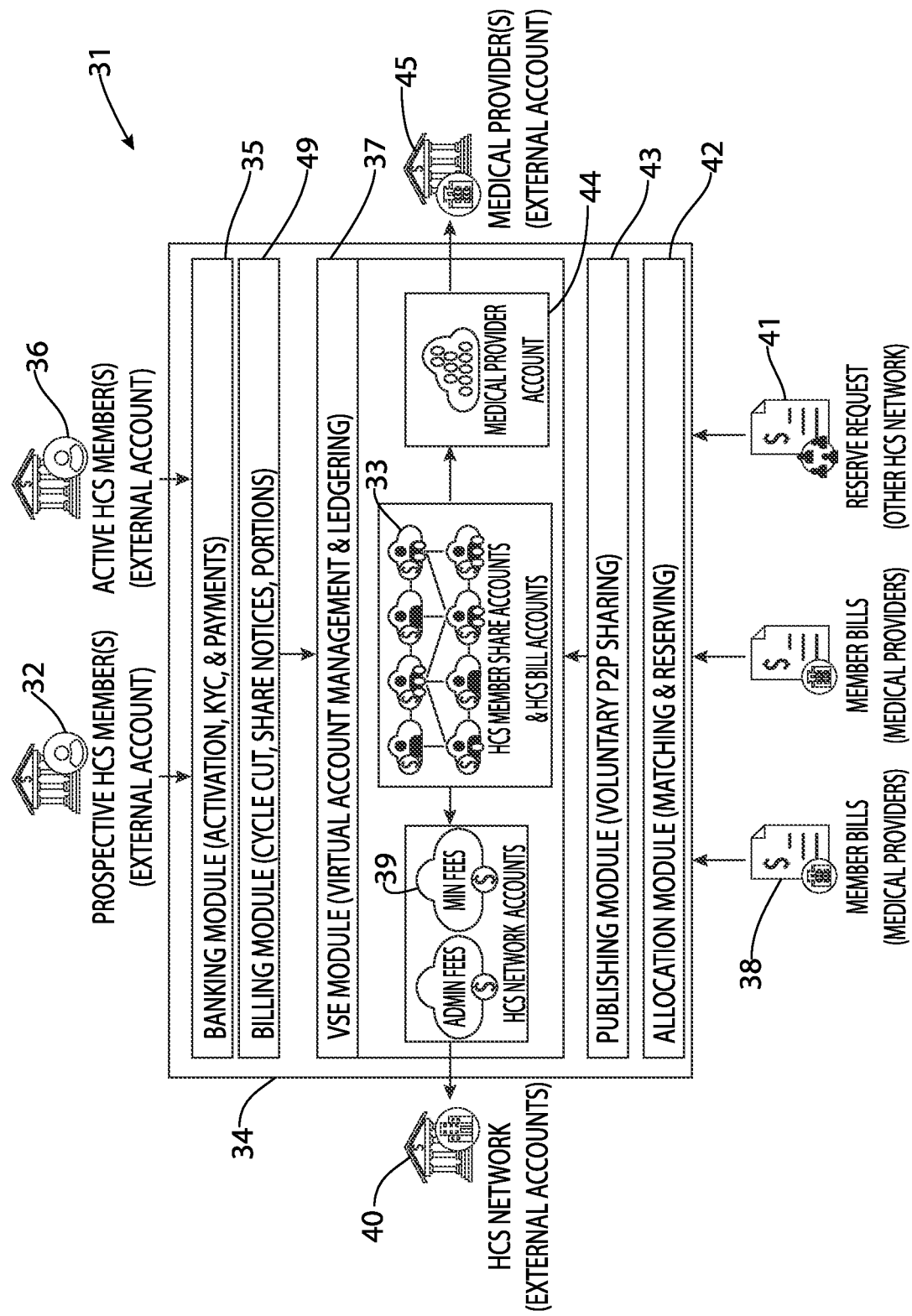
FIG. 2 is a schematic block diagram of an example virtual share exchange (VSE) network platform which may participate in the computing system of FIG. 1.

Referring initially to FIGS. 1-2, a computing system 30 which provides for payment sharing across different virtual share exchange (VSE) network platforms 31 is now described. By way of background, individuals joining forces as a group to achieve certain benefits and advantages is common in many facets of our everyday life. The power of groups is largely evident in the pooling practice found in the traditional insurance model. By pooling their resources through a centralized insurance company or common fund, groups are able to finance, reserve, and pay the expenses associated with the type of insurance risk. Without being able to rely on the insurance company and its practice of pooling funds, the individuals would be left to bear the cost and risk of a catastrophic loss by themselves.

Historically, traditional insurance companies were largely successful at helping groups of individuals finance and reserve for their expenses and catastrophic risk. By collecting and pooling both the risk and the resources of individuals into centralized group fund, traditional insurance coverage and the benefits obtained therefrom were made more affordable. In the past, the efficiency of pooling and reserving resources in a centralized fund enabled insurance companies to not only provide affordable coverage, but to capture a profit or bounty for pooling those resources into a central fund. Resources that are collected and pooled into the centralized fund are called "premiums", which is derived from the Latin word "praemium" and defined as a "reward, profit or bounty for a specified act". Thus, insurance companies were able to generate significant profit by extracting a "premium" from groups of individuals who were unable to pool resources to finance and reserve for their individual risk of catastrophic loss and costs.

Traditionally, the affordability of insurance coverage was predicated upon the overall wellness of the group and their consumption of services. For example, in healthcare, some members' need for medical services could be little more than annual checkups, while other individuals might need to access and consume services much more extensively. It is the latter group that has a greater effect on the overall costs of the group and the subsequent premiums collected. For those that do not frequently draw upon the centralized fund's resources, being lumped with the more extensive users is unfavorable. On the flip side, those who consume a larger share of the benefits may enjoy lower premiums because the individuals that consume little are subsidizing the expense of frequent consumers. In the past, insurance companies would respond to individuals who draw disproportionally on the centralized fund by raising their premiums to maintain group equity and ensure company profits.

With respect to financing and reserving for health care, the average consumer would not be able to afford much more than the very basic of health care services if the pooling of resources was not available through insurance. In fact, based upon current rates being charged by the medical industry, cutting edge or life-saving surgeries, drugs and treatments would be difficult, if not, impossible, for the average consumer to obtain.

However, in recent years the affordability and profitability of the traditional insurance model has been degraded by the enactment of government regulations. New laws and regulations have all but eliminated an insurance company's ability to segment groups of healthy individuals into centralized funds, or plans, that price premiums according to the group's health and draw on resources. Similarly, new regulations have mandated that all centralized funds, or plans, cover new and more extensive medical services not historically offered by health insurance companies. As a result, health insurance companies have been greatly limited in their ability to offer affordable coverage that is reflective of the health condition and medical usage of individual participants, as well offer affordable plans that provide access to the medical services that participants actually desire, versus services the government mandates.

Another disadvantage of the health insurance model and the associated regulations is that individuals of the centralized fund and plan can lead unhealthy or "at risk" lifestyles such as high-risk diets, low exercise, smoking, excessive alcohol intake and the use of illicit drugs, all without consequence. By engaging in such lifestyles, these individuals increase their likelihood of drawing on the resources and benefits of the centralized fund. The more these "high-risk" individuals are allowed to make choices and lead lives without consequences, the more likely that costs and premiums increase for everyone in the fund.

An additional disadvantage of the centralized insurance model is that the plan benefits are distributed to individuals of the group in such a way that no other individual participating in the plan has any real sense of what types of benefits or services are being paid for by the insurance company. The centralized insurance model provides no visibility into the size of the fund, the number of participating individuals, the size of available reserves, the flows of money, or profits pocketed by the insurance company. Thus, participating individuals are unaware of the financial health and wellness of the fund. This lack of transparency also makes individuals feel less responsible for their lifestyle choices that increase their draw of resources, as well as less connected and accountable to their fellow participants who are paying their bills.

The structural inefficiencies, inherent in the design of the centralized health insurance model, have been recently exposed by the new government mandates and regulations in health care. It has caused a rapid and unsustainable rise in premiums and insurance costs. Thus, the centralized health insurance model has become unaffordable and subsequently obsolete. And while the changes have been focused exclusively on healthcare, the aforementioned problems similarly persist in the other insurance markets.

As a result, consumers have sought out new and more innovative ways to organize themselves into groups that leverage the strength of their combined resources to finance and reserve for their health care costs. Unlike the centralized insurance model, consumers are turning to decentralized network models that are enabled by technologies that replace the pooling functions of traditional insurance companies.

In recent years, health care sharing has emerged as the most popular "decentralized" approach to financing and reserving for health care costs. As a "non-insurance" concept, health care sharing is not encumbered by insurance regulations. Individual participants are legally and ultimately responsible for their own medical bills. However, participants in Health Care Sharing Networks willingly and consistently share from their own personal funds to pay each other's medical bills. Health care sharing networks have been in existence since the early 1980s, but in recent years have grown to become a significant alternative to the centralized insurance model. Today, health care sharing networks enjoy safe harbor exemptions in U.S. health care laws and more than 30 states. Participants of health care sharing networks are sharing billions of dollars worth of medical bills on an annual basis. Free from insurance regulations, health care sharing networks can design and implement programs that are more efficient and affordable than insurance, as well as hold participants more accountable to each other.

As noted above, some health care sharing networks implement a technology framework often called a Virtual Share Exchange or VSE. The VSE may include a collection of computing hardware (e.g., servers or other computing devices including microprocessors and associated memory with non-transitory computer readable instructions) to implement virtual account management, billing, and payment modules that form a comprehensive and transparent health care sharing process. The VSE model enables health care sharing networks to facilitate sharing programs on a P2P (or member-to-member) basis to help ensure that these sharing networks refrain from the practice of insurance, and remain in compliance with the safe harbor exemptions of insurance rules/regulations.

Moreover, contemporary VSE platforms 31 have enabled healthcare sharing networks to rapidly grow and scale their networks by leveraging social trends towards the democratization of centralized institutional business models, like health insurance. Modern VSE platforms 31 have become advanced Fintech applications that integrate all the stakeholders and financial processes that facilitate member-to-member sharing, which will now be discussed further with reference to FIG. 2.

Prospective members 32 are consumers who are applying for membership into the sharing network and its community. In order to complete their application for membership, prospective members 32 set-up and activate their share account 33 through a computing device(s) 34, such as a server. In an example embodiment, the computing device 34 may be part of a cloud computing architecture, although other configurations may be used in different embodiments. Share accounts 33 are activated through a graphical user interface or GUI (often called the Application Center or Activation Center) to access account activation services within a banking module 35 of the computing device 34.

Active members 36 are consumers who have been accepted and are active in the sharing network and associated community. Active members 36 make monthly deposits (called monthly share amounts) electronically into their share account 33 that is held within a VSE/for the benefit of (FBO) module 37 of the computing device 34. To pay (or deposit) their monthly share amount into their share account 33, members 36 access services within the banking module 35 through a graphical user interface, as noted above. The banking module 35 provides services that enable members 36 to link their share account 33 to an external payment method and initiate recurring monthly transactions.

The banking module 35 may be implemented as a cloud-based application that enables both prospective members 32 and active members 36 to activate and manage their participation in the sharing network's program through a financial account (called a share account 33) that the member owns and controls. The banking module 35 enables members 36 to link an external bank account to their share account 33, to fund their share account per the terms of the sharing network, and to manage banking and regulatory compliance.

The billing module 49 may be implemented as a cloud-based application that calculates monthly share prices and creates the monthly share notices for the sharing network.

Moreover, the billing module bills, publishes and collects the monthly share notice per the terms of the sharing network.

The VSE/FBO module 37 may also be implemented as a cloud based virtual account management and ledgering system that enables the sharing network to facilitate the member-to-member sharing and payment of member bills. The VSE/FBO module 37 enables member-to-member sharing through virtual accounts 33 that are owned and individually controlled by the members 36 and not the sharing network, as well as to house those virtual accounts in a single FBO account held by a financial institution "for the benefit of" the member 36.

The member share accounts 33 are member owned and controlled virtual accounts maintained by the VSE/FBO module 37, and are required for members 36 to participate in the sharing network. The share accounts 33 enable the sharing network to build distributed reserves in accounts that are owned and controlled by its members 36, and facilitate member-to-member sharing through those accounts.

Sharing network fee accounts 39 are virtual accounts maintained by the VSE/FBO module 37 that are owned and controlled by the sharing network and used to comply with any potential regulatory constraints. The fee accounts 39 help segregate "member owned" funds that are held in share accounts 33 and used for sharing from "network owned" funds, which are operating fees that are billed and collected as a part of a monthly share notice.

Sharing network external accounts 40 are external bank accounts that are owned and controlled by the sharing network and are linked to a specific sharing network fee account 39 that resides in the VSE/FBO module 37. As operating fees are collected through the payment by members 36 of monthly share notices, sharing networks are able to access those funds by transferring them out of the sharing network fee account 39 to its linked external account 40. The sharing network external accounts 40 allow for withdrawing operating funds out of the VSE/FBO module 37.

The member bills 38 are invoices billed by a member's service provider that have been received by the sharing network. The member bills 38 are to be shared by the members of the sharing network per the network's guidelines.

A sharing reserve request 41 represents a member bill from another sharing network that is participating in a federation or collaboration of sharing networks who have agreed to share in each other's member bills per the terms of a shared reserve agreement, as will be discussed further below.

An allocation module 42 may be implemented as a cloud-based bill matching and allocation service enabling sharing networks to facilitate bill sharing, help ensure regulatory compliance, and to generate more meaningful sharing transactions. The allocation module 42 may be used to match and allocate bills on a member-to-member basis, and to draw down distributed bills in a way that is equitable to all members 36.

A publishing module 43 may be implemented as a cloud-based notification and sharing service for initiating member-to-member (P2P) account transfers. The publishing module 43 notifies members 36 as to whose bill they have been matched to, and how much of their available share account 33 balance has been allocated as a contribution to the payment that member's bill, as well as to provide each matched member with the means to voluntarily share (agree) in the payment of that bill.

The provider account 44 is a virtual account within the VSE module 37 that is owned and managed by individual service providers, or a single virtual "settlement" account that aggregates funds for multiple payments made to multiple service providers, or some combination of both. The provider account(s) 44 segregate funds that have been shared and collected for the payment of a bill 38 or 41, and to make those funds available to the appropriate service provider.

An external provider account 45 is a linked external account owned and managed by an individual service provider for transferring funds out of the VSE/FBO module 37 or linked external account owned and managed by a payment processor for transferring multiple payments to be made to multiple service providers. More particularly, the provider external accounts 45 allow for withdrawing bill 38, 41 payments out of the VSE/FBO module 37.

Sharing networks have traditionally only grown the number of members 36 who participate in their own network, and built a reserve balance in the share accounts 33 of their own members alone. However, the system 30 advantageously allows sharing networks to join together across different networking platforms 31 to enhance fiscal strength through "shared reserve agreements" that access the distributed reserves of each other's members.

Insurance companies across all industries build and retain financial reserves as part of their regulatory obligations. Reserves are required to pay large, catastrophic bills, as well as to manage spikes in bill flows that are greater than the ordinary flow of claims. Even though sharing networks are unregulated, they also need to build, retain and access reserves to maintain the fiscal health of the network. To mitigate a rapid and unforeseen drawdown of reserves, insurance companies join forces to offset and share losses through stop-loss and reinsurance contracts. The system 30 advantageously provides a computing infrastructure which allows otherwise disconnected sharing networks using VSE platforms 31 to join forces through shared reserve agreements to offset the impact of bill flow spikes and large bills across of the sharing networks.

More particularly, the computing system 30 and related methods set forth herein advantageously provide for the connection of multiple sharing networks via a virtual share exchange platform, and enable those sharing networks to build and access the distributed reserves held in the share accounts 33 of members 36 across participating networks. Through the implementation of shared reserve agreements, sharing networks can connect and automate the dynamic exchange of member-to-member funds across networks to mitigate the impact of large catastrophic bills and sustain the fiscal integrity of reserves they may not otherwise be able to achieve on their own.

Shared reserve agreements can be implemented and automated by participating networks through the allocation module 42 and the publishing module 43 of the VSE platform 31. Networks who desire to benefit from the fiscal advantages of shared reserve agreements will extend access to these modules 42, 43 to a computing device(s) or server(s) 50 which connects and integrates with the different VSE platforms 31 in a shared reserve configuration. The server 50 may be operated and managed by the participating networks or a trusted service organization, for example. The server 50 illustratively includes a memory 51 which in the present example stores a database of the requisite shared reserve agreement parameters or terms/conditions to be implemented and enforced across the different VSE platforms 31. The server 50 further illustratively includes a processor 52 which implements or operates shared reserve and shared equity regulator modules 53, 54, which will be discussed further below.

Figure 3A:
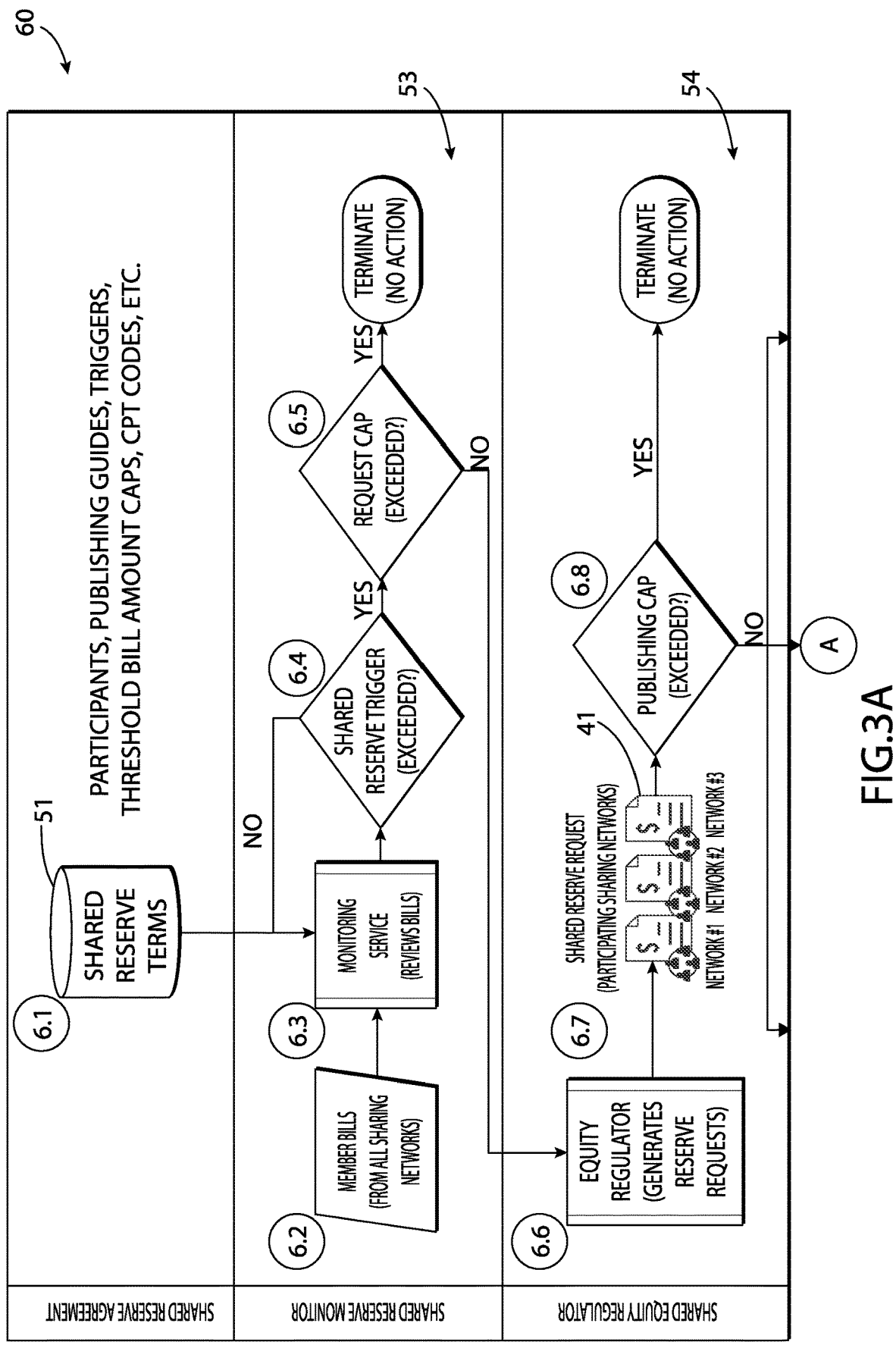
FIGS. 3A and 3B are a system flow diagram illustrating example method aspects associated with the computing system of FIG. 1.
Figure 3B:
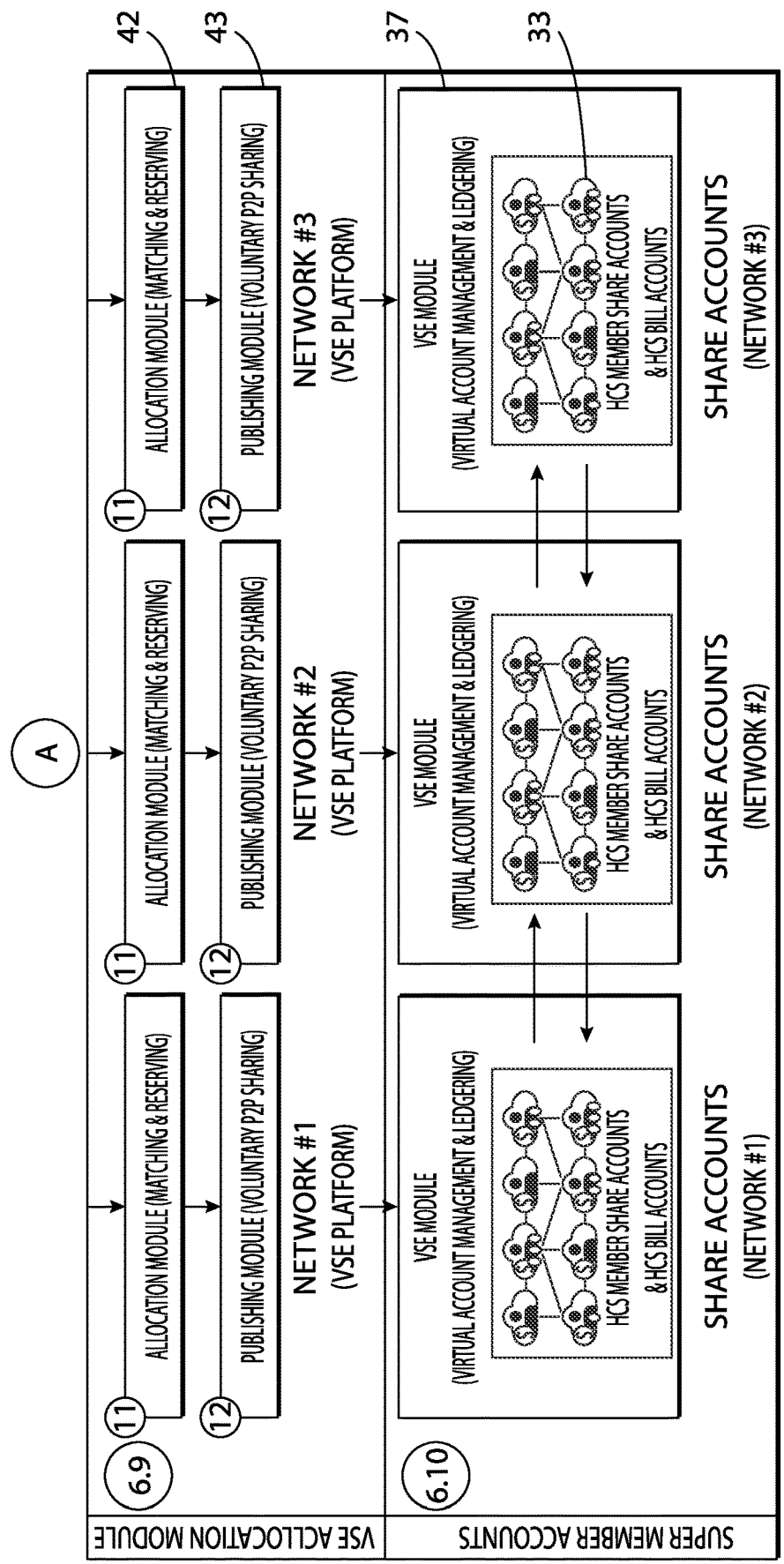

By implementing a shared reserve system, participating networks are able to augment the typical matching and allocation process of a VSE platform 31 to share in the member bills 38 of another sharing network through shared reserve requests 41. To execute cross-network shared reserve agreements, networks first negotiate a set of shared reserve terms and then codify those items into a shared reserve process that spans across their respective VSE platforms 31 and automates several steps to share member bills 33 for payment in an automated fashion per the terms of the shared reserve agreements. These elements will now be described further with reference to the sequence flow diagram 60 of FIGS. 3A and 3B.

Beginning at step 6.1, the shared reserve monitor module 53 is responsible for the simultaneous monitoring and review of the tens of thousands of medical bills that are submitted by the members of each individual sharing network daily. The share reserve monitor 53 may be implemented by integrating the VSEs of multiple sharing networks with the shared agreement server 50 through an event-based programming interface that is configured to identify and isolate bill submissions that meet the definition of a shared reserve trigger (i.e., an Event) as defined in the shared reserve agreement 50. Further, the share reserve monitor 53 can be configured to qualify the submission of each shared reserve trigger (i.e., Event) to the shared reserve regulator 54 based on individual and/or aggregate time-based cap levels defined in the shared reserve agreement 50. The shared reserve monitor 53 can be configured to further qualify shared reserve triggers by publishing guidelines as defined in the shared reserve agreement 50. Publishing guidelines can be set to disqualify bills that meet the definition of a shared reserve trigger, but do NOT meet ALL the publishing guidelines as defined in the shared reserve agreement 50. Publishing guidelines can be set at a bill level (ex. bill types or CPT codes) or at the individual VSE/ sharing network level (ex. minimum reserve level). Shared reserve triggers and publishing guidelines configured into the shared reserve monitor 53 assures and codifies that the participants in the shared reserve agreement 50 that no bill will be submitted to the sharing equity regulator that does not meet or exceed the terms of the share reserve agreement. Thus, deployment of an event-based architecture and programming interface enables the shared reserve monitor 53 and subsequently the system to connect multiple sharing networks into a collaborative inter-VSE agreement for qualifying, allocating, publishing and sharing each other's member bills 33 (received at step 6.2) based on specific instructions and triggers embedded in the program's shared reserve terms, which are stored in the shared reserve database in the memory 51. Implementation of an event-based architecture enables the shared reserve monitor 53 to integrate VSEs that are hosted on a single platform, as well as hosted on other platforms. The event-based programming interface between the multiple VSEs serves as a handshake between disparate sharing organizations and VSEs. Thus, the shared reserve monitor module 53 is enabled as an automated monitoring service that tracks and monitors the submission of tens of thousands of member bills, in real-time, across the VSE platforms 31 of disparate sharing networks (step 6.3) and performs various processing operations based thereon.

More particularly, the shared reserve monitor module 53 enforces the terms of the shared reserve agreement by monitoring inter-VSE bill flows, identifying and isolating bills that meet the definition of a shared reserve trigger (step 6.4), and qualifying these bills by defined capped amounts and publishing guidelines. Thus, a bill that meets the necessary dollar threshold and publishing thresholds will initiate submission to the shared equity regulator and the potential inter-publishing of bill amounts that exceeds the trigger value across all participating sharing networks. Another automated rule that the reserve monitor module 53 may be configured to enforce is that of shared reserve caps or request cap (step 6.5). This is a capped amount (in terms of "requesting" access to shared reserves) that each participating sharing network is allowed to submit during a defined period, as will be discussed further below. It should be noted, however, that in some embodiments the shared reserve trigger function could be implemented at the VSE platform 31 level, in that each VSE platform is configured to only pass along member bills 33 to the server 50 that meet the shared reserve trigger threshold, or this check may be performed at both levels, if desired. Another automated rule that the reserve monitor module 53 enforces is that of shared reserve caps or request cap (step 6.5). This is a capped amount (in terms of "requesting" access to shared reserves) that each participating sharing network is allowed to submit during a defined period, as will be discussed further below.

Furthermore, the shared equity regulator module 54 may automatically performs calculations to adjust the participation level of each sharing network to help ensure that no one sharing network carries a burden that is materially greater than another network over a specified period of time (step 6.6). More particularly, the shared equity regulator module 54 ensures that shared reserve requests meet applicable equitable sharing guidelines (step 6.7). That is, the shared equity regulator module 54 calculates from a member bill 33 amount the "equitable" amount that other participating networks are to match. The shared equity regulator module 54 also determines a capped amount, or publishing cap, (in terms of "publishing" shared reserve requests) that each participating sharing network is required to publish and share during a defined period (step 6.8), and prohibits publishing of shared reserve requests if the publishing cap is exceeded, as will be discussed further below. This results in a "unique" shared reserve request that is calculated and submitted by the system into the VSE of each participating sharing network.

The shared equity regulator module 54 then allocates and publishes these amounts to the members 36 of the respective sharing networks per the terms of the shared reserve agreement (step 6.9) via the allocation and publishing modules 42, 43 of the different VSE platforms 31 (e.g., via communications with them over a network such as the Internet). Specifically, the server 50 publishes a uniquely calculated and regulated shared reserve request through an event-based programming interface to each individual VSE of a participating sharing network. Each unique shared reserve request is then posted via "super" member accounts 33 maintained by each VSE module 37 (step 6.10). These "super" member accounts 33 are virtual share accounts that are held in each sharing network's VSE/FBO Module 37 that are owned and managed by the third-party operator, etc., and are used to facilitate the network-to-network (inter-VSE) sharing transactions related to the shared reserve agreement. To further facilitate transactional transparency of inter-VSE member funds that are shared and collected for a specific shared reserve request, a single use virtual bill account is created and linked to the shared reserve request by each VSE/ sharing network.

Each unique shared reserve request is then published and allocated to the Members of each participating sharing network for sharing (i.e., payment). Allocated funds are then collected in the virtual bill account. Once all allocated member funds have been collected-in-full into the single use Virtual Bill Account, the funds are transferred to the Super Member's Share Account and the single use Virtual Bill account is closed. Funds are then transferred from the contributing Super Member's Account and deposited into the receiving Super Member Account of the requesting Sharing Network (i.e., VSE).

In the case of the VSE platform 31 supporting a healthcare sharing network, a virtual bill account is a temporary account that is opened when the VSE platform receives a member medical bill 38 and then matches, allocates and publishes the bill for sharing. The virtual bill account is linked at least to the member share accounts 33 of the bill owner and bill contributors. The medical provider that submitted the bill is a stakeholder in the sharing process and gains access by establishing a provider account 44 on the VSE platform 31. Other potential stakeholders might be P2P lenders (members), or third-party lenders who desire to assist members in paying bills not shared by the network, for example. The virtual bill account is not a sub-account of any one stakeholder. Rather, the virtual bill account is a temporary single purpose account that is linked to potentially multiple stakeholders. Funds collected in a virtual bill account are restricted and unavailable dollars, but can be displayed in a designated graphical user interface (GUI) as "pending" (unsettled) transactions in more than one stakeholder's account.

The virtual bill accounts advantageously provide a special purpose data structure that allows for the replacement of direct transfers between member share accounts (which would otherwise be a violation of applicable insurance regulations by a VSE) with the use of single purpose accounts that are automatically spawned and closed by the VSE 37 on demand (which are compliant with exemptions to health insurance regulations allowing for direct member-to-member bill sharing). That is, the VSE 37 dynamically creates and activates single purpose virtual bill accounts to coordinate sharing transactions for a specific medical bill 38. In this approach, P2P sharing is facilitated through a virtual bill account that is dynamically activated by the VSE whenever a bill is allocated and published for sharing, and then deactivated when the bill has been shared and resolved.

Virtual bill accounts may be uniquely linked to (1) the member share account of the bill owner, (2) the member share accounts of bill contributors, and (3) the provider account of the bill service provider who submitted the bill. For example, the virtual bill accounts may be established within a database architecture in which the unique IDs of members 36 and/or member accounts 33 are linked to a unique table that is created on the fly to define the virtual bill account responsive to the submission of a medical bill 38 to be funded.

Virtual bill accounts may be relatively inexpensive to implement and relatively easy to manage and use, plus they are addressable. More particularly, each virtual bill account has an externally addressable routing and account number from which checks and ACH transactions can be drawn. The VSE platforms 31 accordingly may incorporate recent Fin-tech developments in virtual account management and ledgering to facilitate a more advanced form of healthcare sharing. In the VSE platforms 31, all accounts that are created and activated enjoy the benefits of a physical bank account. Member share accounts 33, provider accounts 44 and virtual bill accounts may all reside within a VSE/FBO module 37, which may be implemented within a single physical bank account held by a financial institution. The FBO account at the financial institution is held and titled "for the benefit of" the sharing network's members 36. All account transactions within the VSE/FBO account are "on us" transactions and are simple to initiate and manage, and may be done for relatively little or no cost.

The VSE/FBO module 37 monitors all sharing transactions and collections in the virtual bill account. The virtual bill account remains open and active until sharing transactions, equal to the published amount, have been received. Once the member medical bill 38 is fully funded, the VSE module 37 transfers the balance of the virtual bill account to the provider account 44 (or outside of the VSE module) as the network's approved payment for that bill. Once all funds have been transferred to the provider's account, the VSE module 37 automatically deactivates and archives the virtual bill account with detailed member-to-member sharing transactions for the bill.

In the contact of the system 30, virtual bill accounts may be implemented in the following manner to implement an inter-VSE sharing event. At a contributing VSE 31, a "unique" shared reserve request is received from the shared equity regulator 54 that has been calculated specifically for the contributing VSE. The contributing VSE 31 creates a virtual bill account for collecting member funds. The virtual bill account is linked to the super member account of the contributing VSE 31, and the "unique" shared reserve request. The "unique" share reserve request is matched and allocated across the members of the contributing VSE 31. Funds are transferred (i.e., shared) from the members accounts to the virtual bill account. Once member funds have been collected-in-full in the temporary virtual bill account, they are then transferred directly to a super member account (via a separate temporary receiving virtual bill account) of the receiving VSE 31.

More particularly, the receiving VSE 31 receives notice of a "qualifying" bill and creates the temporary virtual bill account for collecting inter-VSE funds. This virtual bill account is linked to the super member account of the receiving VSE 31 and the "qualifying" bill. Funds are transferred from the virtual bill accounts (linked to unique shared reserve requests) of the contributing VSEs 31 to the virtual bill account of the Receiving VSE's. Once inter-VSE funds have been collected-in-full in the virtual bill account of the receiving VSE 31, they are then transferred directly to the super member account as a replenished reserve.

Considered in other terms, the system 30 provides for a collaboration or federation of healthcare sharing networks who share in the catastrophic or extraordinary medical bills of each other's members 36. Like any health insurance company, catastrophic medical bills such as organ transplants, neonatal intensive care and life-threatening emergencies can place a great strain on the fiscal soundness of a healthcare sharing network. Also, like insurance companies who offset the costs of catastrophic care through stop-loss and reinsurance agreements, healthcare sharing networks can connect and offset the costs of catastrophic care through shared reserve agreements that are automated and executed across the VSE platforms 31 from which they operate.

Healthcare sharing networks who have implemented VSE platforms 31 are unique in the way they facilitate member-to-member sharing, and have been successful in leveraging the social trends towards democratization to grow and scale their networks. These sharing networks are also unique in that they have been the most fiscally sound healthcare sharing networks because of their ability to build distributed reserves in the share accounts of their members. Thus, healthcare sharing networks who build distributed reserves and facilitate member-to-member sharing are uniquely enabled to combine their individual fiscal strengths by entering into an automated shared reserve agreement to sustain their respective reserve levels.

To automate and execute cross-platform reserve agreements, the VSE platforms 31 extend and integrate their respective allocation modules 42 publishing modules 43 to communicate with the server 50 that is managed directly by the participating sharing networks or by a trusted service organization. Once connected to the shared reserve system, healthcare sharing networks are enabled to participate in an automated shared reserve process that is engineered or configured to automatically accept, match, allocate, and publish shared reserve requests that are generated by the system 30 and shared by the members 36 of the networks who are a party to the shared reserve agreement.

A shared reserve agreement is an electronic contract that is executed through the shared reserve system 30 and integrates multiple healthcare sharing networks into a collaborative agreement to allocate, publish and share each other's member bills 38. The shared reserve agreement is implemented using an executable software program that initiates and manages the shared reserve terms in which the program operates in an automated fashion. The shared reserve terms represent the specific computer-readable instructions, terms and requirements in which the sharing networks agree to automatically allocate, publish and share the member bills 38 of another healthcare sharing network. While any number of instructions, requirements and terms can be coded in the shared reserve terms, four of the basic elements or terms noted briefly above are now discussed in further detail.

Sharing networks are the healthcare sharing networks who have agreed to match, allocate, publish and share in the "catastrophic medical bills" of members of another participating network via their VSE platforms 31. In the present example, the participating sharing networks are identified with an active network identification number (ID) that is recognized and monitored by the server 50.

As noted briefly above, the publishing trigger is the net bill amount that the participating healthcare sharing networks have agreed will initiate the publishing and sharing of a catastrophic medical bill across the members 36 and platform of the participating networks. The shared reserve trigger enables sharing networks to define a catastrophic medical bill in terms of a "net amount". Most shared reserve terms may be configured to publish and share amounts across the participating networks that are above the trigger value. In one example configuration, the publishing trigger may be set at $200,000 (plus 5%). Thus, if any medical bill of any participating healthcare sharing network exceeds $200,000, then the participating networks will publish and share any eligible amounts over $210,000 (i.e., $200,000*1.10). Of course, other amounts or thresholds may also be used.

With respect to publishing guidelines, these are the specific restrictions, conditions and/or contingencies that are to be adhered to before a member's medical bill 33 can be submitted and published to participating sharing networks in the form of a shared reserve request 41. In one example, the publishing and sharing of cross-network medical bills has been limited to three publishing guidelines or conditions. The first is medical bills with certain Current Procedural Terminology (CPT) codes are ineligible to be published and shared across the VSE platforms 31 of participating networks. Restricting bills of certain CPT codes enables networks to agree upon the types of procedures and treatments that they are willing to accept.

The second condition is that the healthcare sharing network with a catastrophic bill is to have a minimum amount of distributive reserves held in member share accounts 33 before its catastrophic bills will be shared across the participating networks. Requiring a minimum reserve level incentivizes all participants to build reserves by appropriately pricing their monthly share amount appropriately, so as not to be a burden on the other sharing networks who participate in the shared reserve agreement. The third condition is that a healthcare sharing network with a catastrophic bill is also to keep their administration (admin) fee amounts below a certain level in order for their catastrophic bills to be shared across the members 36 and VSE platforms 31 of other networks. Requiring a maximum admin rate incentivizes all participants to control their operating expenses and not be a burden on the sharing networks who participate in the shared reserve agreement.

With respect to shared reserve caps, as noted above these are additional restrictions that may be programmed into the shared reserve terms of an automated shared reserve agreement. Sharing caps are used to limit the financial participation of individual sharing networks. In an example embodiment, two types of shared reserves caps are configured. The first is the submission cap, namely a limitation or threshold set on the healthcare sharing network(s) who has a catastrophic medical bill 38 above the publishing trigger. Submission caps may be based on a specific amount over a specified period. In one example, the submission cap is set at $750,000 over a 90-day period. Thus, the combined catastrophic bills (of any individual network) that have been submitted to be shared by the members of the participating sharing networks is not permitted exceed $750,000 over a 90-day period. Other values and time periods may also be used in different embodiments.

The second type of shared reserve cap is the above-noted publishing cap. Again, this is a publishing and sharing limitation or threshold set on the healthcare sharing network(s) who has shared in the catastrophic medical bills of other sharing networks and has exceeded a specified shared amount within a specified period. In one example, the publishing cap is set at $500,000 over a 60-day period. Thus, the combined amount of medical bills that have been published and shared by the members of a single participating sharing network is not permitted to exceed $500,000 within a 60-day period. Other values and time periods may also be used in different embodiments.

To automate shared reserve agreements, the shared reserve system 50 may advantageously monitor the flow of all medical bills 33 across the VSE platforms 31 of the participating healthcare sharing networks. Thus, the system 50 is equipped with a shared reserve monitor that provides the business logic and monitoring services to data mine medical bills that have been adjudicated and are eligible to be shared by the networks per the shared reserve terms. The shared reserve monitor module 53 provides the services and logic to identify catastrophic medical bills that exceed the publishing trigger and are eligible to be published to the sharing networks per the publishing guidelines and shared reserve caps.

However, not all sharing networks will be equal in terms of the number of members 36, reserves, etc. To sustain the continued participation in the shared reserve agreement, an equitable balance, in terms of means and contributions, may be ensured for both small and large healthcare sharing networks. Thus, the system 30 advantageously provides the shared equity regulator module 54 to balance each network's financial participation in the shared reserve agreement. The shared equity regulator is programmed with the business logic and network intelligence to calculate each network's ability to financially contribute in every shared reserve request. While there are any number of ways to create a multivariate algorithm to assess a network's ability to contribute, four elements or components which may be used by the shared equity regulator module 54 for this purpose are now described with reference to the example shown in table 70 of FIG. 4.

Sharing network variables (section 71) are demographics and financial details of the participating networks that are consistently used in a calculus to assess the available shared reserves (section 72), the calculated contribution (section 73), and/or the equitable contribution (section 74) of a specific healthcare sharing network. In the present example, the sharing network variables used to calculate the available shared reserves are distributed reserves, the minimum reserve months and actual reserve months. the variable used to derive the calculated contributions where the number of sharing units (member households of HHs) and the reserve request per unit. The variable used to assess the equitable contributions was the 60-day shared reserves and the equity adjustment.

Available shared reserves (section 72) is the portion or amount of the distributed reserves held in the member share accounts 33 of a healthcare sharing network that can reasonably be shared with participating networks. Available shared reserves are funds that are above the amount necessary to meet the minimum reserve months that a healthcare sharing network should retain for itself. In some shared reserve agreements, the minimum reserve months is a publishing guideline in the shared reserve terms. In the present example, the available shared reserves were calculated by subtracting the minimum reserve months from the actual reserve months to derive the excess reserve months. the excess reserve months was then converted into available shared reserves by factoring the excess reserve months by the averaged shared amount (HH/Mo.) and the number of sharing units (HHs.)

The calculated contribution (section 73) is the contribution amount that a participating healthcare sharing network agrees to contribute, if all things are equal. It is the preliminary contribution amount, before the amount has been factored by any additional rules embedded in the shared reserve terms or a multivariate algorithm based on sharing network variables that derive a contribution amount that is more equitable and balanced in relationship to the contributions of the other sharing networks. In the present example, the calculated contribution was derived by dividing the number of sharing units (HHs) by the reserve request amount that accompanies the shared reserve request 41 (FIG. 5).

The equitable contribution (section 73) is the amount that the shared reserve regulator has determined is the equitable amount that each participating healthcare sharing network is to contribute to a specific shared reserve request. The equitable contribution is a derivative of the calculated contribution, as it is factored by any additional rules embedded in the shared reserve terms or a multivariate algorithm based on sharing network variables. The equitable contribution is the amount that a participating sharing network is to publish to its members for sharing. In the present example, the equitable contribution is derived by applying the publishing cap to the calculated contribution.

The shared reserve system 50 produces a fully adjudicated and completed version of the shared reserve request 41 (FIG. 5) that has met the publishing trigger documented in the shared reserve terms of the shared reserve agreement. The completed version of the shared reserve request is to be published to the participating healthcare sharing networks and shared by the members of each network. The server 30 publishes the completed shared reserve request into the allocation module 42 of each VSE platform 31 of each network. Specifically, the equitable contribution amount that has been calculated for each respective network is matched, allocated and published as a super member bill and is shared by that network's members, as discussed above. Example elements which may be included in a fully adjudicated and completed shared reserve request 41 are now described.

Member bill details are the specific demographic details of a catastrophic medical bill 38 that the participating healthcare sharing networks require for publishing into their respective networks. Financial details are the specific financial details of a catastrophic medical bill that the participating healthcare sharing networks require for publishing into their respective networks. The reserve request amount is the maximum adjudicated or calculated amount that can be published and shared by the participating healthcare sharing networks per the share reserve terms. participating network details are the specific demographic and financial details of the participating healthcare sharing networks that are required for publishing by the networks. equitable contribution amounts are the specific equitable contribution amounts, for each respective network, that the participating healthcare sharing networks have agreed to publish and share per the shared reserve agreement.

To help maximize the fiscal soundness of their respective networks and to fully benefit from their participation in a shared reserve agreement, sharing networks may advantageously place their trust in an automated and auditable shared reserve system 30 that is engineered to consistently and accurately execute a shared reserve process. By way of example, this process may include the following technical advantages.

One is to embed the shared reserve terms into a programmatic and executable electronic shared reserve agreement computing architecture that is approved, visible and shared with all participating sharing networks through GUIs, etc. Another advantage is the capability to electronically monitor and review all adjudicated medical claims of the participating sharing networks in an automated fashion through a shared reserve monitoring service module 51. Another technical advantage is to automatically identify all catastrophic medical bills, those that meet or exceed the publishing trigger amount embedded in the shared reserve terms.

Further, the server 50 may automatically adjudicate the submission eligibility of the catastrophic medical bill per the publishing guidelines and the submission caps embedded in the shared reserve terms. Through the shared equity regulator module 54, the equitable contributions of each participating healthcare sharing network may automatically be calculated to be published and shared by the members 36 across all of the different VSE platforms 31. The shared equity regulator module 54 adjudicates the publishing eligibility of each participating sharing network to identify if any network has exceeded the publishing caps embedded in the shared reserve terms.

Another technical advantage of the system 30 is the ability to automatically generate and publish across multiple VSE computing platforms 31 a fully adjudicated and completed shared reserve request 41 for all participating sharing networks who have not exceeded their publishing caps, and to submit the adjudicated shared reserve request 41 to the allocation module 42 of each VSE platform 31 to be shared by its members 36. Still another technical advantage is that each sharing network may automatically match, allocate, and publish its unique equitable contribution amount to be shared by the members of its community, with matched and allocated funds then automatically and electronically being transferred to the sharing network's "super" member account 33. Furthermore, funds may be collected in the super member accounts 33 of participating sharing networks and electronically transferred (the equitable contribution) to the super member account of the network with the catastrophic medical bill.

As more healthcare sharing networks adopt VSE platforms 31 to facilitate medical sharing, they also enable themselves to better compete with the health insurance model and industry. Where the health insurance industry mitigates the risk of catastrophic medical bills through reinsurance and stop-loss, sharing networks can mitigate those same risks by implementing shared reserve agreements that span across their VSE platforms 31. However, unlike the insurance industry, sharing networks do not have to expense the cost of reinsurance to mitigate catastrophic risk. By integrating their VSE platforms 31 with a computer-based shared reserve system 30 that consistently executes an agreed upon shared reserve process in an automated fashion, sharing networks can automate their participation in shared reserve agreements and build an industry with a fiscal soundness that matches insurance.

The system 30 may be implemented using one or more computing devices such as servers, network interface devices, client devices, etc., including the appropriate hardware (e.g., processor, memory, etc.) and software having non-transitory computer-readable instructions for performing the operations discussed herein. Moreover, in some embodiments the system 30 may be implemented within a cloud computing network, as discussed above. Moreover, it will be appreciated that the systems and methods set forth herein may also be used with other types of cost or expense sharing platforms besides healthcare sharing networks, such as automotive repair bills, home appliance repair bills, veterinary bill sharing, etc. That is, the system 30 may also support other share networks beyond just health care sharing.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing system comprising:
a plurality of different virtual share exchange (VSE) network platforms, each VSE network platform being configured to maintain member sharing accounts for respective members and electronically transfer funds between the sharing accounts to share payment of member healthcare bills across a plurality of the member sharing accounts based upon a respective set of individual reserve parameters for intra-VSE payment sharing, and to maintain a respective super member account for each of the other VSEs allowing the other VSEs to participate in the intra-VSE payment sharing; and
a server comprising a memory and a processor configured to cooperate with the memory to
connect the plurality of different VSE network-network platforms together via a VSE computing platform,
store a database of instructions and event-based triggers coded in shared reserve parameters different than the individual reserve parameters for inter-VSE payment sharing across the VSE computing platform,
receive requests from the VSE network platforms to share payment of extraordinary healthcare bills from their members via respective application programming interfaces (APIs) configured to identify bill submissions having a value exceeding a threshold bill amount across the other VSE network platforms,
determine, based upon the instructions coded in the shared reserve parameters, a shared reserve for each VSE network platform that submits an extraordinary healthcare bill for payment sharing, the shared reserve corresponding to a value of member healthcare bills the VSE network platform is permitted to share across the other VSE network platforms, and verify that the VSE network platform has not exceeded the shared reserve, and
publish, based upon the event-based triggers coded in the shared reserve parameters and via the APIs and super member accounts, automatically in real time each extraordinary healthcare bill for payment sharing across the VSE network platform to the other VSE network platforms as a respective member of each VSE network platform upon verification that the VSE network platform submitting the extraordinary healthcare bill has not exceeded the shared reserve.

2. The computing system of claim 1 wherein each VSE network platform is further configured to dynamically generate in real time for each inter-VSE payment sharing event a single purpose table in a database on the VSE computing platform for the given member healthcare bill submitted for payment sharing corresponding to the given healthcare provider, the single purpose table defining a temporary virtual bill account solely for reconciliation of the respective member healthcare bill, the temporary virtual bill account being externally addressable through a routing number and a unique account number.

3. The computing system of claim 1 wherein the shared reserve comprises a submission cap corresponding to a total value of extraordinary healthcare bills submitted to be shared from one or more of the VSE network platforms within a time period.

4. The computing system of claim 1 wherein the shared reserve comprises a publishing cap corresponding to a total value of extraordinary healthcare bills published and shared from one or more of the VSE network platforms within a time period.

5. The computing system of claim 1 wherein the processor is further configured to maintain a database of restricted Current Procedural Terminology (CPT) codes, and restrict publishing of extraordinary healthcare bills for payment sharing to the other VSE network platforms having the restricted publishing codes.

6. The computing system of claim 1 wherein the processor is further configured to receive all member healthcare bills from each of the VSE network platforms, and restrict publishing of member healthcare bills for payment sharing across the other VSE network platforms that do not have a value exceeding the threshold bill amount.

7. The computing system of claim 1 wherein the processor is further configured to determine a distributive reserve of funds held in member sharing accounts for each VSE network platform that submits an extraordinary healthcare bill for payment sharing, and restrict publishing of extraordinary healthcare bills for payment sharing when the VSE network platform submitting the extraordinary healthcare bill has a distributive reserve below a distributive reserve threshold.

8. The computing system of claim 1 wherein each of the VSE network platforms comprises a publishing module in memory to publish member healthcare bills to the VSE computing platform, and wherein the processor is configured to publish the extraordinary healthcare bill for payment sharing to the other VSE network platforms through their publishing modules.

9. The computing system of claim 1 wherein the processor is further configured to calculate a respective contribution amount for payment sharing for each of the other VSE network platforms based upon a number of members in each VSE network platform, and publish each extraordinary healthcare bill for payment sharing to the other VSE network platforms in accordance with their respective contribution amounts.

10. The computing system of claim 1 wherein each of the VSE network platforms comprises an allocation module in memory to match member sharing accounts with published member healthcare bills; and wherein the processor is configured to receive shared payment for the extraordinary healthcare bill from the VSE network platforms, and distribute the shared payment to the VSE network platform requesting payment sharing of the extraordinary healthcare bill via its allocation module.

11. A method comprising:
using a server to connect a plurality of different virtual share exchange (VSE) network platforms together via a VSE computing platform, each VSE network platform being configured to maintain member sharing accounts for respective members and electronically transfer funds between the sharing accounts to share payment of member healthcare bills across a plurality of the member sharing accounts based upon a respective set of individual reserve parameters for intra-VSE payment sharing, and to maintain a respective super member account for each of the other VSEs allowing the other VSEs to participate in the intra-VSE payment sharing;
storing at the server a database of instructions and event-based triggers coded in shared reserve parameters different than the individual reserve parameters for inter-VSE payment sharing across the VSE computing platform;
receiving requests at the server from the VSE network platforms to share payment of extraordinary healthcare bills from their members via respective application programming interfaces (APIs) configured to identify bill submissions having a value exceeding a threshold bill amount across the other VSE network platforms;
determining, at the server and based upon the instructions coded in the shared reserve parameters, a shared reserve for each VSE network platform that submits an extraordinary healthcare bill for payment sharing, the shared reserve corresponding to a value of member healthcare bills the VSE network platform is permitted to share across the other VSE network platforms, and verifying that the VSE network platform has not exceeded the shared reserve; and
publishing, using the server and based upon the event-based triggers coded in the shared reserve parameters and via the APIs and super member accounts, automatically in real time each extraordinary healthcare bill for payment sharing across the VSE computing platform to the other VSE network platforms as a respective member of each VSE network platform upon verification that the VSE network platform submitting the extraordinary healthcare bill has not exceeded the shared reserve.

12. The method of claim 11 further comprising, at each VSE, dynamically generating in real time for each inter-VSE payment sharing event a single purpose table in a database for the given member healthcare bill submitted for payment sharing corresponding to the given healthcare provider, the single purpose table defining a temporary virtual bill account solely for reconciliation of the respective member healthcare bill, the temporary virtual bill account being externally addressable through a routing number and a unique account number.

13. The method of claim 11 wherein the shared reserve comprises a submission cap corresponding to a total value of extraordinary healthcare bills submitted to be shared from one or more of the VSE network platform within a time period.

14. The method of claim 11 wherein the shared reserve comprises a publishing cap corresponding to a total value of extraordinary healthcare bills published and shared from one or more of the VSE network platform within a time period.

15. The method of claim 11 further comprising, at the server, maintaining a database of restricted Current Procedural Terminology (CPT) codes and restricting publishing of extraordinary healthcare bills for payment sharing to the other VSE network platforms having the restricted publishing codes.

16. The method of claim 11 further comprising, at the server, receiving all member healthcare bills from each of the VSE network platforms and restricting publishing of member healthcare bills for payment sharing across the other VSEs that do not have a value exceeding the threshold bill amount.

17. The method of claim 11 further comprising, at the server, determining a distributive reserve of funds held in member sharing accounts for each VSE network platform that submits an extraordinary healthcare bill for payment sharing and restricting publishing of extraordinary healthcare bills for payment sharing when the VSE network platform submitting the extraordinary healthcare bill has a distributive reserve below a distributive reserve threshold.

18. The method of claim 11 further comprising, at the server, calculating a respective contribution amount for payment sharing for each of the other VSE network platforms based upon a number of members in each VSE network platform; and wherein publishing further comprises publishing each extraordinary healthcare bill for payment sharing to the other VSE network platforms in accordance with their respective contribution amounts.

* * * * *